MULTI-PHASE SEMICONDUCTOR RECTIFYING APPARATUS UTILIZING SERIES CONNECTED SILICON CONTROLLED RECTIFIERS SYMPATHETICALLY FIRED
Filed June 2, 1960
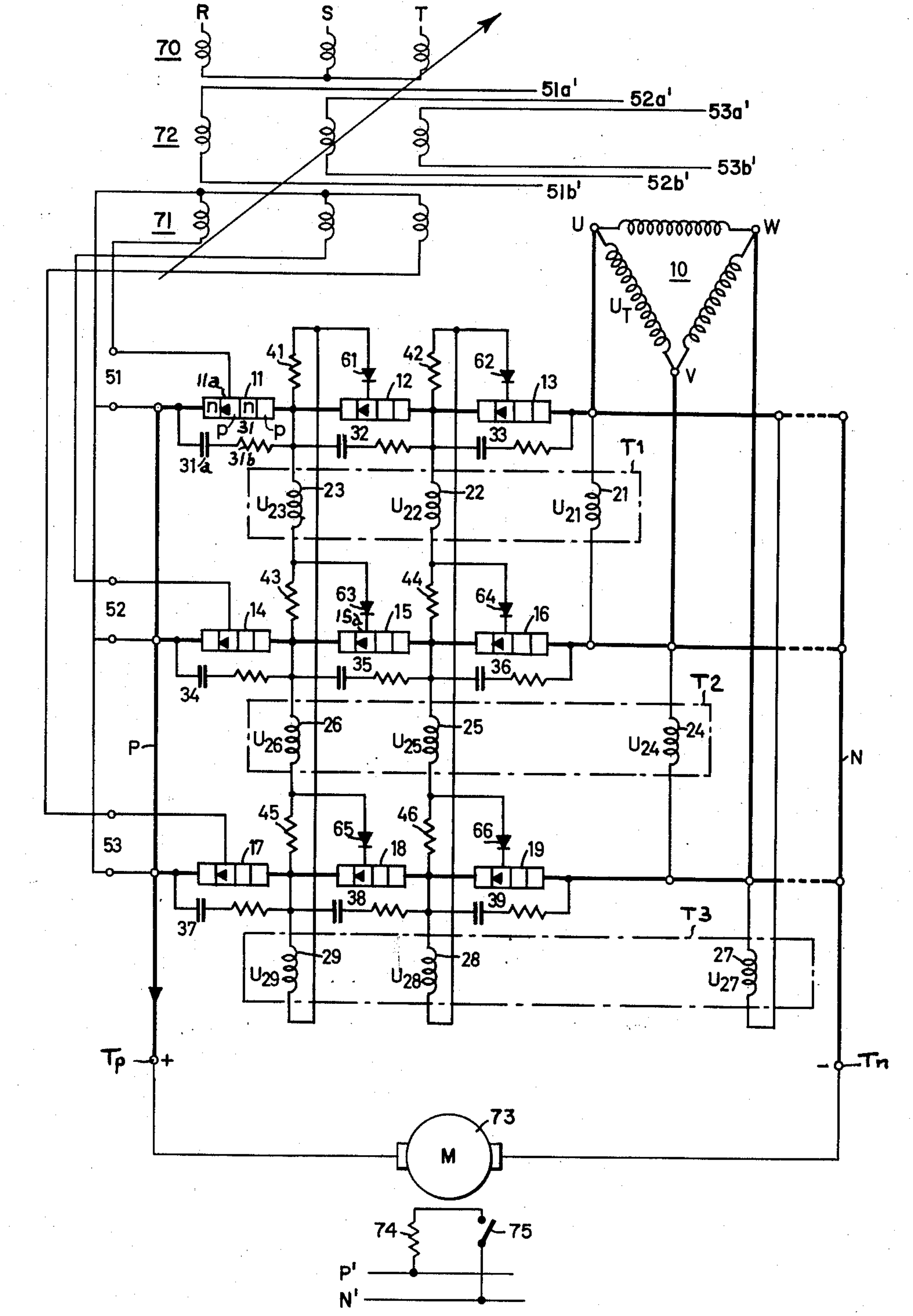

United States Patent Office 3,122,695

Patented Feb. 25, 1964

3,122,695

MULTI-PHASE SEMICONDUCTOR RECTIFYING APPARATUS UTILIZING SERIES CONNECTED SILICON CONTROLLED RECTIFIERS SYMPATHETICALLY FIRED

Wolfgang Meissen, Erlangen, Germany, assignor to Siemens-Schuckertwerke Aktiengesellschaft, Berlin-Siemensstadt, Germany, a corporation of Germany Filed June 2, 1960, Ser. No. 33,430
Claims priority, application Germany June 4, 1959
8 Claims. (Cl. 321—16)

My invention relates to multi-phase power translating apparatus, particularly for rectifying and related purposes, in which a network of controllable semiconductor rectifier units is used for translating alternating current into rectified current of controllable or regulatable voltage. More particularly, my invention relates to rectifying apparatus of the above-mentioned type in which the multi-phase interconnected rectifier units consist of junction-type semiconductor devices with at least three electrodes of which one, hereinafter called gate electrode, serves to control the commencement of current flow during each voltage half wave in which the flow of current is in the forward direction of the semiconductor device. Such semiconductor devices have become known as "four-layer" junction rectifiers of the n-p-n-p or p-n-p-n type and, since usually formed of silicon, are often called silicon controlled rectifiers. The operation of such a rectifier is comparable to that of a thyratron or other gas-filled electronic tube which becomes conductive only when a gate voltage or firing voltage is applied to a control electrode and which thereafter remains conductive during the forward half-wave of the flowing current until the current passes through the zero value.

More particularly my invention concerns multi-phase power translating apparatus in which the voltage in each individual phase of the rectifying network is so large as to require a series connection of two or more controllable semiconductor devices. It has become known to provide such networks of series-connected semiconductor rectifiers or the like valve devices with a shunt path connected parallel to each valve device and comprising a capacitor or an ohmic resistor or a series-connection of both types of impedances. Such networks have further been provided with auxiliary transformers connected across the phase circuits of the rectifier network between circuit points of the same median (effective) potentials for the purpose of enforcing a uniform distribution of the blocking voltage upon the series-connected valve devices in each phase circuit.

Heretofore, in rectifying and similar power translating systems of the type just described, each individual semiconductor device has been provided with its own control circuit for impressing a switching signal upon the gate or firing electrode. These control circuits are energized by voltage supplied from a suitable signal source. The necessity, in the known systems, of isolating the individual control circuits from each other and providing them with the required control components renders such systems rather intricate and susceptible to trouble in the great number of accessory components.

It is therefore an object of my invention to devise a semiconductor valve or rectifier system of the above-mentioned multi-phase type, operating with individually controlled semiconductor switching devices, that affords a greatly simplified construction and an appreciable reduction in number of accessory components while securing the desired reliability of firing or switching operation.

To this end, and in accordance with a feature of my invention, I provide only one of the number of series-connected semiconductor switching valves in each phase circuit of the network with a control circuit to be excited by voltage from an extraneous source of firing voltage, but control all other semiconductor devices of the same series-connected group sequentially in cascade fashion by voltage derived from the working current of the previously fired semiconductor valve.

According to another, more specific feature of my invention, I connect a resistor in series with each of the secondary windings of the above-mentioned auxiliary transformers serving to have all series-connected semiconductor devices share the phase voltage; and I derive from across this series-connected resistor the control voltage needed for firing or switching another semiconductor device of the same phase circuit. Thus, the extraneous source of control voltage is employed only for applying a starting signal to the first one of the series-connected semiconductor devices in each phase circuit of the rectifier network, whereas the other semiconductor devices in each series group are provided with subsidiary control circuits responding to the operation of the precedingly initiated operation of another semiconductor device.

The above-mentioned and further objects, advantages and features of my invention, said features being set forth with particularity in the claims annexed hereto, will be apparent from, and will be explained in, the following description of the embodiment of a voltage controllable three-phase rectifier according to the invention, whose schematic circuit diagram is illustrated by way of example on the accompanying drawing.

The illustrated power-current rectifier comprises a power-input transformer whose three-phase secondary windings 10 are connected to three-phase buses, the three phases and buses being generally denoted by U, V, W. The rectified power is supplied to a positive bus P and a negative bus N connected to respective direct-current output terminals T*p* and T*n*. The rectifying connections between the three alternating-current phases U, V, W and the direct-current output terminals is established by a three-phase bridge network of semiconductor rectifiers comprisnig a total of six network branches or phase circuits. Only three of these phase circuits, extending between the alternating current buses and the positive output terminal T*p* are illustrated, the corresponding three-phase circuits between the buses U, V, W and the negative terminal T*n* being indicated by heavy broken lines because they are identical with those shown and are arranged or interconnected in exact mirror-symmetrical relation thereto.

Each of the phase circuits of the rectifier network is provided with three semiconductor valve devices 11, 12, 13, and 14, 15, 16 and 17, 18, 19. These semiconductor valve devices are shown schematically as four-layer silicon rectifiers of the controlled type. That is, each of these individual rectifiers constitutes an n–p–n–p junction device. Referring for example to the controlled silicon rectifier 11 in the U-phase leading to the positive terminal T*b*, the main electrodes of p-type and n-type conductance respectively are serially connected in the phase circuit, and the rectifier will pass current only during the positive half wave of the alternating voltage provided the gate electrode 11*a*, located beyond the first p–n junction counted from the positive terminal T*p* receives the proper firing voltage.

The system is provided with three auxiliary transformers T1, T2, T3. The primary windings 21, 24 and 27 of these transformers are multi-phase connected to the secondary windings of the main transformer 10; that is, the primary windings 21, 24 and 27 in the illustrated system are connected parallel to the respective deltaconnected secondaries of the power transformer 10. Each of the auxiliary transformers comprises a total of four secondary windings of which only the two relating to the fully illustrated half-portion of the system are shown. These two secondaries of transformer T1 are denoted by 22, 23, those of transformer T2 by 25, 26 and those of transformer T3 by 28 and 29.

The secondary windings enforce a uniform distribution of the blocking voltage on the three junction rectifiers serially connected in each individual phase circuit. For this purpose, the secondary winding 22 is connected across the two-phase circuits of the rectifying network corresponding to the phases U and V of the alternating current supply. The points where the secondary winding is connected to the respective phase circuits are located between each two adjacent semiconductor devices so that these two points have the same median (effective) potential. The other secondary windings 23 to 29 are cross connected between the phase circuit in an analogous manner.

For securing the desired distribution of blocking voltage upon the semiconductor devices serially connected in each phase circuit, the transformation ratio of each auxiliary transformer is correspondingly adapted. That is, the voltage $U_{21}$, $U_{22}$ and $U_{23}$ of the windings in transformer T1 are graduated relative to each other in accordance with the ratios 3/3:2/3:1/3. The same voltage graduation obtains in auxiliary transformers T2 and T3. The secondary winding 23 induces ⅓ of the secondary voltage $U_T$ of the main power transformer 10 in a loop circuit which comprises a resistor 43, the semiconductor valve device 14 and a voltage-divider component 31 connected in shunt relation to the semiconductor device 11 and constituted by a capacitor 31*a* in series with an ohmic resistor 31*b*. The secondary winding 22 induces ⅔ of the voltage $U_T$ in a loop circuit which comprises a resistor 44, the semiconductor device 15 and a voltage divider group 32 consisting of a capacitor in series with a resistor, jointly shunt-connected to the semiconductor device 12.

The circuitry relating to the other secondary windings of the auxiliary transformers is analogous. Thus, a series-connection of a capacitor and an ohmic resistor is connected parallel to each individual semiconductor valve device, these shunt connections being denoted by 31 through 39; and an ohmic resistor is connected in series with each of the secondary windings 22, 23, 25, 26, 28, 29, these resistors being denoted by 41 through 46 respectively.

Only one of the three semiconductor valve devices in each phase circuit is provided with a primary control circuit with terminals for connection to a source of signal voltage extraneous to the illustrated rectifier system proper. Thus, the firing circuit for the semiconductor device 11 extends from terminals 51 to the positive bus P and to the gate electrode 11*a* respectively. Analogously, the semiconductor devices 14 and 17 are connected to respective pairs 52 and 53 of control-voltage terminals. The other semiconductor devices are fired by dependently operating, subsidiary control circuits constituted by the loop circuits of resistors 41 through 46 described above. Also connected to the gate electrodes of the semiconductor valve devices and substantially in parallel relation to the above-mentioned resistors 41 through 46 are respective diodes 61 through 66.

The operation of the rectifier system will be described presently, disregarding at first the presence and purpose of the auxiliary diodes 61 to 66.

As long as all semiconductor valve devices 11 to 19 are blocked, the uniform distribution of the blocking voltage on the semiconductor devices serially connected in each phase circuit is maintained by means of the voltage dividers 31 to 39. The operation of the auxiliary transformers T1, T2, T3 to enforce a corresponding subdivision of the blocking voltage takes place only after a series of semiconductor valve devices has been fired and is conductive.

Assume, for example, that the valve device 14 is fired by applying a short current pulse from the extraneous control assembly to the terminals 52 and hence to the gate electrode. As soon as this occurs, the voltage $U_{23}$ of the secondary winding 23 in auxiliary transformer T1 drives a current through the parallel connection of resistor 43 and gate electrode 15*a* of valve device 15. Thence the current passes through valve device 14 and voltage divider 31. The resistor 43 is so dimensioned that the voltage drop caused by the flow of current in the just-mentioned loop circuit is sufficient for firing the semiconductor valve device 15. For example, the resistor 43 has a rated voltage drop of 0.6 to 1 volt when operating with controlled silicon rectifiers.

After firing of valve device 15, the voltage $U_{22}$ of secondary winding 22 drives a current through resistor 44 and the gate-electrode circuit of valve device 16 from which this current passes through the previously ignited valve device 15 and through the valve device 14 and thence through the voltage dividers 31 and 32. As a result, the last semiconductor valve device 16 of the series group is also fired.

Such firing of the series-connected valve devices takes place sequentially but practically without delay. When the control impulse for valve device 17 is supplied to the terminals 53 from the extraneous source of control voltage, the above-described ignition sequence is repeated with respect to the series-connection of valve devices 17, 18 and 19 with the exception that the firing current for valve devices 18 and 19 no longer flows through the voltage dividers 34 and 35 but through the already conducting valve devices 14 and 15. The series-connection of valve devices 11 to 13 is fired in the same manner when the leading valve device 11 is fired by the control pulse supplied from the extraneous control assembly to the terminals 51.

The firing of the series-connected semiconductor valve devices in the right-hand portion (not illustrated) of the three-phase bridge network takes place in the same manner as described above.

In certain cases the semiconductor valve devices used in the power-rectifying apparatus may have a blocking current of such magnitude that the current, flowing through the resistor in series with the secondary winding of the auxiliary transformer for enforcing a uniform subdivision of the blocking voltage upon the series-connected semiconductor valves, is large enough to make the voltage drop, then occurring along that resistor prior to the ignition moment, sufficient for igniting the semiconductor valve device. In such cases it is preferable to insert the above-described diodes 61 to 66 in series with the gate electrodes of the respective semiconductor devices. Due to the presence of these non-linear impedances, the voltage drop across the correlated resistors 41 to 46 can pass a current through the gate electrode of the semiconductor valve device only when this voltage drop becomes larger than required for impressing upon the diode a voltage in excess of its critical threshold voltage. Consequently the semiconductor valve device can be fired only when, due to prior firing of the preceding semiconductor valve device, the current in the subsidiary control circuit of the next following semiconductor valve device reaches a much higher value than available during the blocking phase.

In the illustrated embodiment of rectifying apparatus according to the invention, the source of extraneous control voltage is shown to consist of a controllable transformer whose primary winding 70 is connected to the same three-phase line that energizes the power transformer 10. The transformer has two groups 71 and 72 of three-phase secondary windings. The transformer is of the rotary type and permits varying the phase position of the secondary voltages relative to the primary voltage. The firing pulses for the rectifier units are thus constituted by sinusoidal half-waves which pass from the secondary windings to the control terminals of the semiconductor valve units. The star-connected secondary windings 71 thus furnish the firing pulses for the valves 11, 14, 17 of the left-hand bridge branches. The secondary windings 72 which are not star-connected with each other, furnish the pulses for the valve units of the right-hand bridge branches, i.e., are connected, in analogy to the secondary windings 71, to the lead pairs 51$a'$, 51$b'$ and 52$a'$, 52$b'$ and 53$a'$, 53$b'$ of the three semiconductor valves that correspond to valves 11, 14 and 17 respectively.

The firing of a semiconductor unit takes place at the moment in which the ascending half-wave of the sinusoidal voltage applied to the central electrode of the particular unit, reaches the ignition value of that unit. By turning the assembly of secondary windings 71, 72 relative to the primary windings 70, the ignition moment of the semiconductor units can be displaced within the period of the alternating-voltage half-wave, whereby the magnitude of the rectified output voltage across terminals T$p$ and T$n$ is correspondingly controlled.

A current rectifying apparatus according to the invention is particularly well suitable for controlling and regulating the rotating speed of direct-current motors whose armature is connected in the load circuit of the rectifier apparatus. Shown on the drawing is a speed-controllable direct-current motor whose armature 73 is connected to the output terminals T$p$ and T$n$ of the rectifying apparatus. The motor 73 may be separately excited, for example by means of a field winding 74 connected through a switch 75 to direct-current buses T′ and N′ which may furnish a constant direct voltage or may be connected to the respective buses T and N.

Instead of providing the auxiliary diodes 61 to 66 poled in the forward direction of the control current, other voltage-dependent or non-linear resistance components may be used for increasing in the subsidiary control circuits the firing voltage furnished by the voltage drop of the respective resistors 41 to 46. For example, auxiliary valves poled in the inverse (blocking) direction may be used for this purpose. Preferably employed are Zener diodes of particularly low threshold or peak-inverse voltage values, for example below 10 volts.

While the invention as described above is preferably applied to power rectifying apparatus equipped with four-layer junction-type semiconductor rectifiers, the illustrated semiconductor devices 11 to 19 may also be substituted by feed-back connected power transistors which, as well known, are likewise controllable in accordance with the operation of thyratrons, it being merely necessary to connect the base of each switching transistor in the manner illustrated for the gate electrode, so that the transistor control circuit extends between the base and the emitter, with the phase circuit extending through the emitter and collector of the transistor.

It will be understood by those skilled in the art, upon a study of this disclosure, that my invention is amenable to various other modifications and hence may be given embodiments other than particularly illustrated and described herein, without departing from the essence of the invention and within the scope of the claims annexed hereto.

I claim:

1. Rectifying apparatus, comprising multi-phase alternating-current supply buses, two rectified-current output terminals, respective phase circuits connecting each of said buses with one of said respective terminals, a number of controllable semiconductor valve devices of thyratron-type switching performance having respective pairs of main electrodes serially connected with uniform poling in each of said respective phase circuits and having a gate electrode for controlled switching of each valve device, a number of transformers each having a primary winding connected across two of said buses different from the two buses across which each of the other primary windings is connected, each of said transformers having secondary windings of which each is connected across two of said phase circuits between respective two circuit points having the same median effective potential, each of said two points being located between two adjacent ones of said valve devices whereby said transformers distribute the blocking voltage substantially uniformly upon said series-connected valve devices in each phase circuit; main control circuits equal in number to that of said phase circuits, each of said control circuits extending between one of said main electrodes and said gate electrode of only one of said series-connected valve devices in each of said phase circuits for switching only said one valve device; subsidiary control circuits of which each is connected between one of said main electrodes and said control electrode of one of said other valve devices respectively, each of said subsidiary control circuits including a resistor connected in series with the one of said respective secondary windings that is electrically adjacent to said latter one main electrode, whereby the voltages impressed by said secondary windings upon said respective resistors serve to switch said other valve devices upon switching of said one valve device.

2. Rectifying apparatus comprising three-phase alternating-current supply buses, two rectified-current output terminals, a three-phase bridge network having six branches connecting each of said buses with one of said respective terminals, a number of controllable semiconductor valve devices of thyratron-type switching performance having respective pairs of main electrodes serially connected with uniform poling in each of said six branches of said bridge network, each of said semiconductor valve devices having a gate electrode for controlled switching of each valve device, three transformers having respective primary windings in three-phase connection with said buses, each of said transformers having secondary windings of which each is connected across two of said network branches at respective points located between adjacent ones of said valve devices in each branch and having the same median effective potential whereby said transformers distribute the blocking voltage substantially uniformly upon said series-connected valve devices in each phase circuit; impedance means connected in shunt relation to each of said respective valve devices; main control circuits of which each extends between one of said main electrodes and said gate electrode of only one of said series-connected valve devices in each of said network branches for switching only said one valve device; subsidiary control circuits of which each is connected between one of said main electrodes and said control electrode of one of said other valve devices respectively, each of said subsidiary control circuits including a resistor connected in series with the one of said respective secondary windings that is electrically adjacent to said latter main electrode, whereby the voltages impressed by said secondary windings upon said respective resistors serve to switch said other valve devices upon switching of said one valve device.

3. In rectifying apparatus according to claim 2, said impedance means in shunt connection with each of said semiconductor valve devices comprising a capacitor and a resistor connected in series with each other.

4. Rectifying apparatus according to claim 1, comprising non-linear voltage-dependent resistance members, each of said members being connected in one of said respective subsidiary control circuits between said resistor and said gate electrode of the semiconductor valve device controlled by said subsidiary control circuit, said member having the poling required to pass firing current to said gate electrode only when the voltage of said resistor exceeds a given value.

5. Rectifying apparatus according to claim 1, comprising a diode connected in each of said respective subsidiary control circuits between said resistor and said gate electrode of the semiconductor valve device controlled by said subsidiary control circuit, said diode having its forward direction coincide with the flow direction of the switch control current passing through said subsidiary control circuit to said gate electrode.

6. Rectifying apparatus, comprising multi-phase alternating-current supply buses, two direct-current output terminals, respective phase circuits connecting each of said buses with one of said respective terminals, a number of controllable four-layer semiconductor junction rectifiers serially connected in each of said phase circuits with uniform poling to pass current in a given direction through said phase circuit when said number of rectifiers are conductive, each of said junction rectifiers having two main electrodes of n-type and p-type conductance respectively and having a gate electrode adjacent to one of said main electrodes but separated therefrom by a p-n junction, a number of transformers having respective primary windings in multi-phase connection across said buses, each of said transformers having secondary windings of which each is connected across two of said phase circuits at respective points located between adjacent ones of said junction rectifiers and having the same median effective potential whereby said transformers distribute the blocking voltage substantially uniformly upon said series-connected junction rectifiers in each phase circuit; main control circuits equal in number to that of said phase circuits, each of said control circuits extending between one of said main electrodes and said gate electrode of only one of said junction rectifiers in each of said phase circuits for switching only one of said rectifiers; subsidiary control circuits of which each is connected between one of said main electrodes and said control electrode of one of said other junction rectifiers respectively, each of said subsidiary control circuits including a resistor connected in series with the one of said respective secondary windings that is electrically adjacent to said latter main electrode, whereby the voltages impressed by said secondary windings upon said respective resistors serve to switch said other junction rectifiers upon switching of said one rectifier.

7. In rectifying apparatus according to claim 1, each of said transformers having between its primary winding and its secondary windings a graduated scale of voltage ratios decreasing by $1:n$ from secondary to secondary, where $n$ is the number of valve devices serially connected in each phase circuit.

8. Rectifying apparatus comprising three-phase alternating-current supply buses, two direct-current output terminals, a three-phase bridge network having six phase circuits connecting each of said buses with one of said respective terminals, a number of controllable four-layer semiconductor junction rectifiers serially connected in each of said phase circuits with uniform poling to pass current in a given direction through said phase circuit when said number of rectifiers are conductive, each of said junction rectifiers having two main electrodes of n-type and p-type conductance respectively and having a gate electrode adjacent to one of said main electrodes but separated therefrom by a p-n junction, a number of transformers having respective primary windings in multi-phase connection across said buses, each of said transformers having secondary windings of which each is connected across two of said phase circuits at respective points located between adjacent ones of said junction rectifiers and having the same median effective potential whereby said transformers distribute the blocking voltage substantially uniformly upon said series-connected junction rectifiers in each phase circuit, each of said transformers having between its primary winding and its secondary windings a graduated scale of voltage ratios decreasing by $1:n$ from secondary to secondary, where $n$ is the number of valve devices serially connected in each phase circuit; main control circuits equal in number to that of said phase circuits, each of said control circuits extending between one of said main electrodes and said gate electrode of only one of said junction rectifiers in each of said phase circuits for switching only one of said rectifiers; subsidiary control circuits of which each is connected between one of said main electrodes and said control electrode of one of said other junction rectifiers respectively, each of said subsidiary control circuits including a resistor connected in series with the one of said respective secondary windings that is electrically adjacent to said latter main electrode, whereby the voltages impressed by said secondary windings upon said respective resistors serve to switch said other junction rectifiers upon switching of said one rectifier.

References Cited in the file of this patent

UNITED STATES PATENTS

| | | |
|---|---|---|
| 2,492,850 | De Mers | Dec. 27, 1949 |
| 2,595,301 | Sager | May 6, 1952 |
| 2,686,262 | Wiley | Aug. 10, 1954 |
| 2,986,692 | Fischer | May 30, 1961 |